US012560927B2

(12) United States Patent
Wang

(10) Patent No.: US 12,560,927 B2
(45) Date of Patent: Feb. 24, 2026

(54) NAVIGATION METHOD AND ROBOT THEREOF

(71) Applicant: PEGATRON CORPORATION, Taipei (TW)

(72) Inventor: Chien-Yu Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 258 days.

(21) Appl. No.: 18/319,635

(22) Filed: May 18, 2023

(65) Prior Publication Data

US 2024/0061426 A1    Feb. 22, 2024

(30) Foreign Application Priority Data

Aug. 16, 2022    (TW) ................................... 111130840

(51) Int. Cl.
G05D 1/00          (2006.01)
(52) U.S. Cl.
CPC ......... G05D 1/0094 (2013.01); G05D 1/0212 (2013.01)
(58) Field of Classification Search
CPC ...... G05D 1/0094; G05D 1/0212; G05D 1/43; G05D 2111/65; G05D 1/628; G05D 2101/15; G05D 1/2424
USPC .......................................................... 701/1
See application file for complete search history.

(56) References Cited

U.S. PATENT DOCUMENTS

| | | | |
|---|---|---|---|
| 11,340,079 B1* | 5/2022 | Ebrahimi Afrouzi | ........................ G01C 21/188 |
| 2020/0192390 A1* | 6/2020 | Luo | ...................... G05D 1/0221 |
| 2021/0064043 A1 | 3/2021 | Kulkarni et al. | |
| 2022/0143412 A1* | 5/2022 | Paydarfar | .......... A61N 1/36125 |

FOREIGN PATENT DOCUMENTS

CN          114005021 B          3/2022

* cited by examiner

*Primary Examiner* — Helal A Algahaim
*Assistant Examiner* — Nazia Afrin
(74) *Attorney, Agent, or Firm* — McClure, Qualey & Rodack, LLP

(57)          ABSTRACT

A navigation method applicable to a robot includes: (a) setting a first position coordinate and first movement information; (b) measuring a plurality of to-be-sensed distances in different directions by using a plurality of distance sensors; (c) inputting the plurality of sensed distances, the first position coordinate, and the first movement information into a neural network model to obtain second movement information; (d) setting the second movement information as the first movement information for a next round of a decision-making process; (e) driving, based on the second movement information, the robot to move from the first position coordinate to a second position coordinate; (f) setting the second position coordinate as the first position coordinate for a next round of the decision-making process; and (g) repeating steps (b) to (f) until a distance between the second position coordinate and a destination coordinate is less than a threshold.

10 Claims, 7 Drawing Sheets

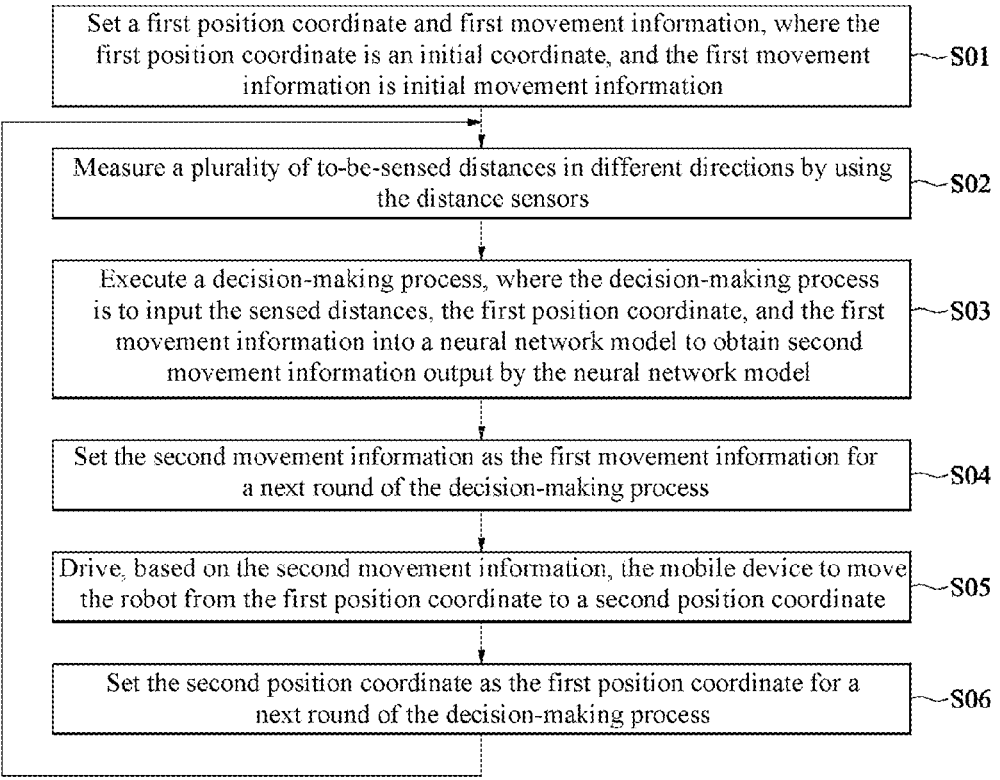

Set a first position coordinate and first movement information, where the first position coordinate is an initial coordinate, and the first movement information is initial movement information — S01

Measure a plurality of to-be-sensed distances in different directions by using the distance sensors — S02

Execute a decision-making process, where the decision-making process is to input the sensed distances, the first position coordinate, and the first movement information into a neural network model to obtain second movement information output by the neural network model — S03

Set the second movement information as the first movement information for a next round of the decision-making process — S04

Drive, based on the second movement information, the mobile device to move the robot from the first position coordinate to a second position coordinate — S05

Set the second position coordinate as the first position coordinate for a next round of the decision-making process — S06

FIG. 3

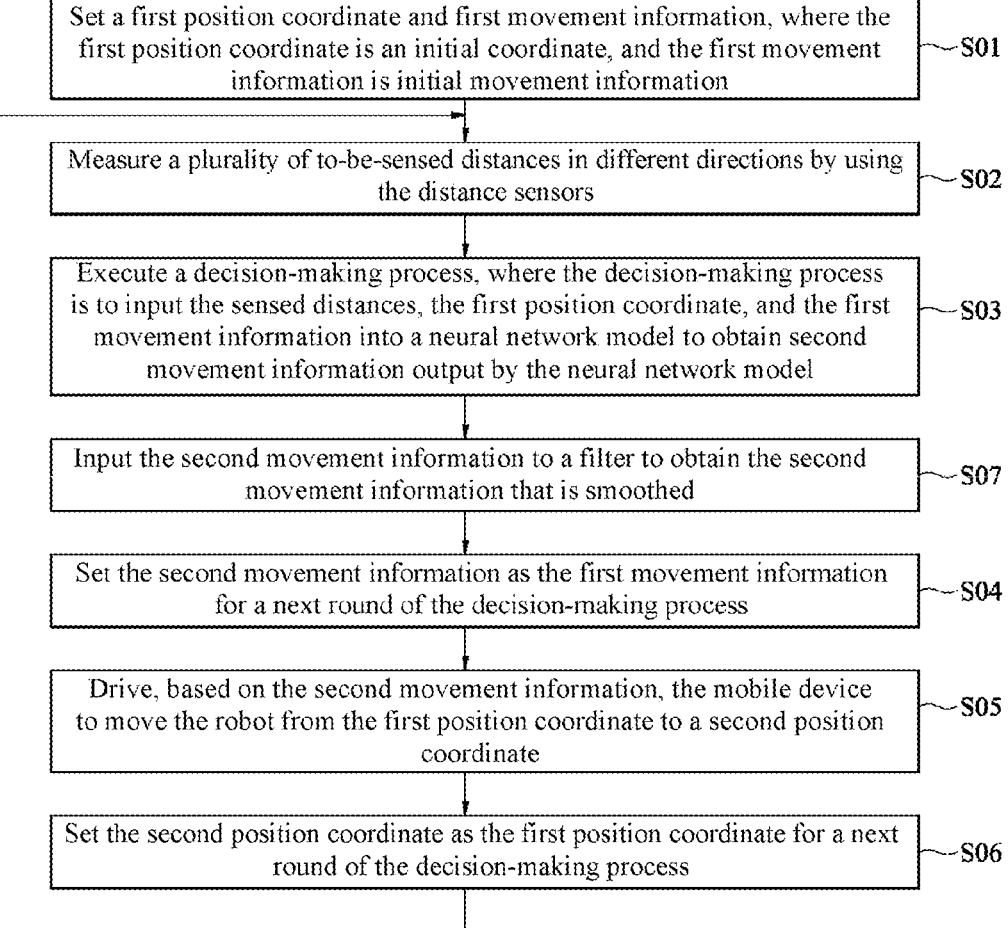

Set a first position coordinate and first movement information, where the first position coordinate is an initial coordinate, and the first movement information is initial movement information ⎯ S01

Measure a plurality of to-be-sensed distances in different directions by using the distance sensors ⎯ S02

Execute a decision-making process, where the decision-making process is to input the sensed distances, the first position coordinate, and the first movement information into a neural network model to obtain second movement information output by the neural network model ⎯ S03

Input the second movement information to a filter to obtain the second movement information that is smoothed ⎯ S07

Set the second movement information as the first movement information for a next round of the decision-making process ⎯ S04

Drive, based on the second movement information, the mobile device to move the robot from the first position coordinate to a second position coordinate ⎯ S05

Set the second position coordinate as the first position coordinate for a next round of the decision-making process ⎯ S06

FIG. 5

NAVIGATION METHOD AND ROBOT THEREOF

CROSS-REFERENCE TO RELATED APPLICATION

This application claims the priority benefit of Taiwan application serial no. 111130840, filed on Aug. 16, 2022. The entirety of the above-mentioned patent application is hereby incorporated by reference herein and made a part of this specification.

TECHNICAL FIELD

The present disclosure relates to robot navigation, and in particular, to a navigation method suitable for a robot and a robot that employs the method, where the method enables the robot to possess some decision-making ability in an unfamiliar environment and greatly reduces complexity of input data.

BACKGROUND

In conventional robot navigation, a robot has to move to each location of a target region first, and creates a map of the target region by using laser radar (Lidar) or a visual Simultaneous Localization and Mapping (Visual SLAM) system. After the map is stored, a user can determine a current location of the robot when starting the SLAM next time, specify any point on the map, and plan a movement route based on a navigation algorithm to make the robot reach a destination. The above process needs to be based on the creation of the map, and the navigation cannot be performed without the map.

If a route guide to a destination needs to be generated when the robot is in an unfamiliar environment, the Lidar or a depth camera is usually used to check a relative distance between the robot and surroundings, and the possibility of walking in various directions is explored continuously by means of conventional algorithms or reinforcement learning. However, algorithms related to reinforcement learning often incur the problem of training difficulties due to complexity of input data and high uncertainty, resulting in long delays in reaching the destination and futile travel on many additional routes.

SUMMARY

According to an embodiment, a navigation method applicable to a robot is disclosed. The robot includes a plurality of distance sensors and a mobile device. The navigation method includes: (a) setting a first position coordinate and first movement information, where the first position coordinate is an initial coordinate, and the first movement information is initial movement information; (b) measuring a plurality of to-be-sensed distances in different directions by using the distance sensors; (c) executing a decision-making process, where the decision-making process is to input the sensed distances, the first position coordinate, and the first movement information into a neural network model to obtain second movement information output by the neural network model; (d) setting the second movement information as the first movement information for a next round of the decision-making process; (e) driving, based on the second movement information, the mobile device to move the robot from the first position coordinate to a second position coordinate; (f) setting the second position coordinate as the first position coordinate for a next round of the decision-making process; and (g) repeating steps (b) to (f) until a distance between the second position coordinate and a destination coordinate is less than a threshold.

In an embodiment, the robot includes a plurality of distance sensors, a movement decision-making circuit, a mobile device, and a control circuit. The plurality of distance sensors is configured to measure a plurality of to-be-sensed distances in different directions. The movement decision-making circuit is configured to repeatedly execute a decision-making process, where the decision-making process is to input the sensed distances, a first position coordinate, and first movement information into a neural network model to obtain second movement information output by the neural network model. The control circuit is configured to drive, based on the second movement information, the mobile device to move from the first position coordinate to a second position coordinate. When the movement decision-making circuit initially executes the decision-making process, the first position coordinate is set as an initial coordinate, and the first movement information is set as initial movement information. After the decision-making process is executed, the movement decision-making circuit sets the second movement information as the first movement information for a next round of the decision-making process. After the control circuit drives, based on the second movement information, the mobile device to move from the first position coordinate to the second position coordinate, the movement decision-making circuit sets the second position coordinate as the first position coordinate of a next round of the decision-making process.

The following describes in detail specific features and advantages of the present disclosure by using embodiments. The content of the embodiments is enough to enable any person skilled in the art to understand the technical content hereof and implement the technical solutions based on the technical content. Any person skilled in the art can easily understand the relevant objectives and advantages of the present disclosure based on the content disclosed herein, the patent scope of the present disclosure, and the drawings appended hereto.

BRIEF DESCRIPTION OF DRAWINGS

FIG. 3 is a flowchart of a navigation method applicable to a robot according to an embodiment of the present disclosure;

FIG. 5 is a flowchart of a navigation method applicable to a robot according to another embodiment of the present disclosure;

DETAILED DESCRIPTION OF EMBODIMENTS

Figure 1:
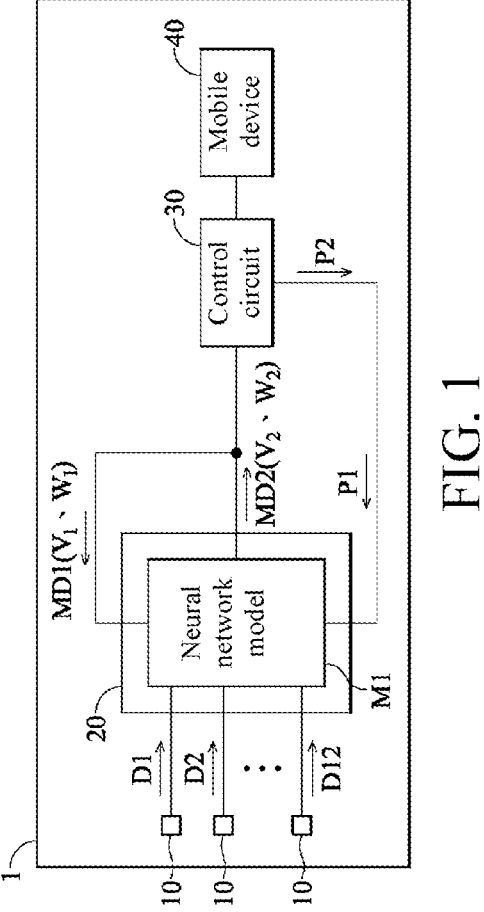
FIG. 1 is a schematic block diagram of a robot according to an embodiment of the present disclosure.

FIG. 1 is a schematic block diagram of a robot 1 according to an embodiment of the present disclosure. Referring to FIG. 1, the robot 1 includes a plurality of distance sensors 10, a movement decision-making circuit 20, a control circuit 30, and a mobile device 40. The plurality of distance sensors 10 is coupled to the movement decision-making circuit 20. The control circuit 30 is coupled to the movement decision-making circuit 20 and the mobile device 40.

Figure 2:
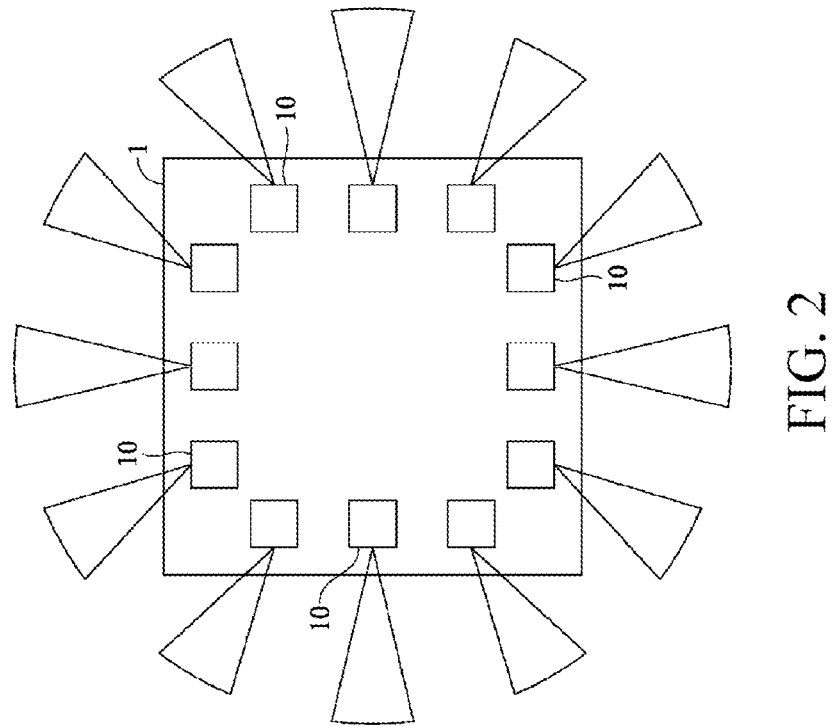
FIG. 2 is a schematic diagram of locations of a plurality of distance sensors of a robot according to an embodiment of the present disclosure.

FIG. 2 is a schematic diagram of locations of a plurality of distance sensors 10 of a robot 1 according to an embodiment of the present disclosure; Referring to FIG. 1 and FIG. 2, the plurality of distance sensors 10 is configured to measure to-be-sensed distances in all different directions. Each distance sensor 10 measures a to-be-sensed distance from a closest object in one direction. For example, the number of distance sensors 10 is 12, so as to measure the to-be-sensed distances D1 to D12. In some embodiments, the distance sensor 10 may be, but not limited to, an ultrasonic sensor.

In some embodiments, the plurality of distance sensors 10 is evenly distributed around the robot 1 to obtain a plurality of sensed distances of the robot 1 in different directions.

The movement decision-making circuit 20 is configured to repeatedly execute a decision-making process. Each time the decision-making process is executed, movement information (hereinafter referred to as second movement information MD2) used for performing a next action may be determined based on current status information. The status information may include a plurality of sensed distances D1 to D12, a position coordinate, and movement information (hereinafter referred to as first movement information MD1). Specifically, the decision-making process is to input the plurality of sensed distances D1 to D12, the first position coordinate P1, and the first movement information MD1 into a neural network model M1 to obtain the second movement information MD2 output by the neural network model M1. In some embodiments, the neural network model M1 is a neural network model used for making an action decision, such as a Deep Deterministic Policy Gradient (Deep Deterministic Policy Gradient) model.

When the movement decision-making circuit 20 initially executes the decision-making process, the movement decision-making circuit 20 sets the first position coordinate P1 as an initial coordinate, and sets the first movement information MD1 as initial movement information.

In some embodiments, the first movement information MD1 includes a first two-dimensional linear velocity V1 and a first angular velocity W1. The initial movement information includes an initial two-dimensional linear velocity and an initial angular velocity. Input dimensions of the decision-making process are determined by a plurality of to-be-sensed distances, the first position coordinate P1, the first two-dimensional linear velocity V1, and the first angular velocity W1. For example, if the number of to-be-sensed distances is 12, the input of the decision-making process is the sensed distances D1 to D12, the first position coordinate P1, the first two-dimensional linear velocity V1, and the first angular velocity W1. Therefore, the input dimensions of the decision-making process are 16 dimensions. Here, the second movement information MD2 output by the decision-making process includes a second two-dimensional linear velocity V2 and a second angular velocity W2.

In some embodiments, the movement decision-making circuit 20 normalizes the first two-dimensional linear velocity V1 to fall within an interval (0, 1) and normalizes the first angular velocity W1 to fall within an interval (−1, 1), but the present disclosure is not limited to such intervals.

After the movement decision-making circuit 20 executes the decision-making process, the movement decision-making circuit 20 sets the second movement information MD2 as the first movement information MD1 for a next round of the decision-making process.

The control circuit 30 is configured to drive, based on the second movement information MD2, the mobile device 40 to move from the first position coordinate P1 to a second position coordinate P2. After the control circuit 30 drives, based on the second movement information MD2, the mobile device 40 to move from the first position coordinate P1 to the second position coordinate P2, the movement decision-making circuit 20 sets the second position coordinate P2 as the first position coordinate P1 of a next round of the decision-making process.

The mobile device 40 is configured to move from the first position coordinate P1 to the second position coordinate P2 when driven by the control circuit 30. In some embodiments, the mobile device 40 may be, but not limited to, a chassis.

In some embodiments, the mobile device 40 moves from the first position coordinate P1 to the second position coordinate P2 at a fixed frequency based on the second two-dimensional linear velocity V2 and the second angular velocity W2 in the second movement information MD2. In some embodiments, the fixed frequency may be, but not limited to, 10 Hz.

FIG. 3 is a flowchart of a navigation method applicable to a robot 1 according to an embodiment of the present disclosure. Referring to FIG. 1 and FIG. 3, the movement decision-making circuit 20 sets initial values of a first position coordinate P1 and first movement information MD1, that is, sets the first position coordinate as an initial coordinate, and sets the first movement information as initial movement information (step S01). The plurality of distance sensors 10 measures a plurality of to-be-sensed distances D1 to D12 in different directions respectively (step S02). The movement decision-making circuit 20 executes a decision-making process. The decision-making process is to input the plurality of sensed distances D1 to D12, the first position coordinate P1, and the first movement information MD1 into a neural network model M1 to obtain second movement information MD2 output by the neural network model M1 (step S03). After the movement decision-making circuit 20 outputs the second movement information MD2, the movement decision-making circuit 20 sets the second movement information MD2 as the first movement information MD1 for a next round of the decision-making process, and transmits the second movement information MD2 to the control circuit 30 (step S04). Based on the second movement information MD2, the control circuit 30 drives the mobile device 40 to move the robot 1 from the first position coordinate P1 to a second position coordinate P2 (step S05). After the robot 1 moves to the second position coordinate P2, the control circuit 30 transmits the second position coordinate P2 to the movement decision-making circuit 20. The movement decision-making circuit 20 sets the second position coordinate P2 as the first position coordinate P1 for a next round of decision-making process and determines whether a distance between the second position coordinate P2 and a destination coordinate is greater than or equal to a threshold (step S06) (not shown in FIG. 3). If the distance between the second position coordinate P2 and the destination coordinate is greater than or equal to the threshold, the robot 1 repeats step S02 to step S06 until the distance between the second position coordinate P2 and the destination coordinate is less than the threshold. When the distance between the second position coordinate P2 and the destination coordinate is less than the threshold, the destination is reached. In some embodiments, the threshold may be set as required, for example, 50 cm.

In some embodiments, step S04 is not necessarily performed before step S05 or step S06. In some embodiments, step S04 may be performed after step S06. In some embodiments, step S04 may be performed after step S05 and before step S06.

Figure 4:
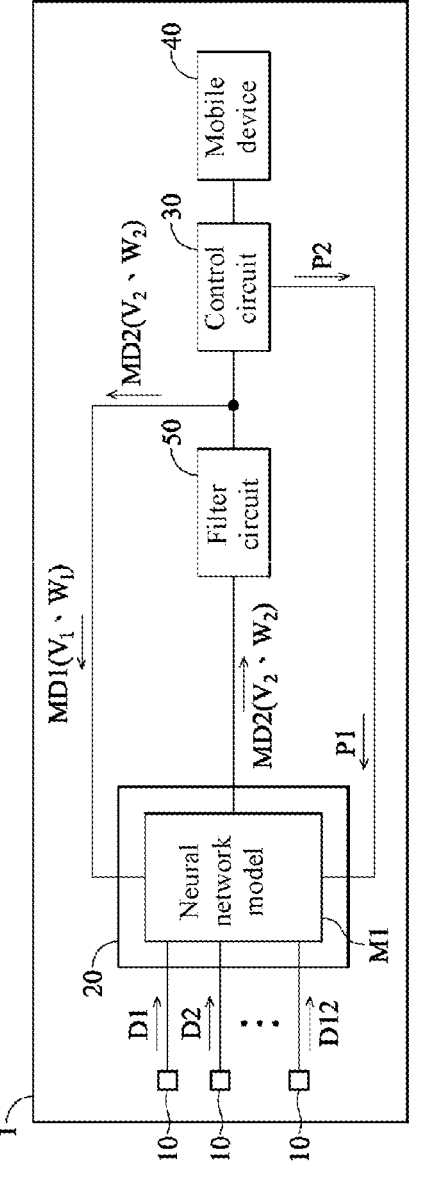
FIG. 4 is a schematic block diagram of a robot according to another embodiment of the present disclosure.

FIG. 4 is a schematic block diagram of a robot 1 according to another embodiment of the present disclosure. FIG. 5 is a flowchart of a navigation method applicable to a robot 1 according to another embodiment of the present disclosure. Referring to FIG. 4 and FIG. 5, in some embodiments, the robot 1 further includes a filter circuit 50 coupled between the movement decision-making circuit 20 and the control circuit 30. The filter circuit 50 is configured to smooth the second movement information MD2 (step S07). Step S07 is performed after step S03 and before step S04 to step S06. In other words, the second movement information MD2 that is set by the movement decision-making circuit 20 as the first movement information MD1 for a next round of decision-making process, and the second movement information MD2 based on which the control circuit 30 drives the mobile device 40, are both the second movement information MD2 smoothed by the filter circuit 50. In some embodiments, the filter circuit 50 may be, but not limited to, an extended Kalman filter (Extended Kalman Filter).

Figure 6:
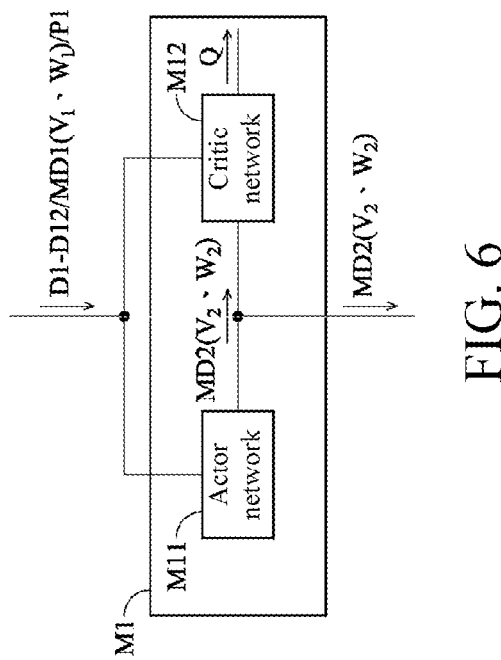
FIG. 6 is a schematic block diagram of a neural network model according to an embodiment of the present disclosure.

FIG. 6 is a schematic block diagram of a neural network model according to an embodiment of the present disclosure; and Referring to FIG. 6, in some embodiments, the neural network model M1 includes an actor network (Actor network) M11 and a critic network (Critic network) M12. The actor network M11 is configured to determine the second movement information MD2 based on the sensed distances D1 to D12, the first position coordinate P1, and the first movement information MD1. The critic network M12 is configured to output an evaluation value Q based on the sensed distances D1 to D12, the first position coordinate P1, the first movement information MD1, and the second movement information MD2 determined by the actor network M11.

The actor network M11 inputs 16-dimensional information into two neural layers that each include 512 output neurons, so as to obtain an output of a Rectified Linear Unit (ReLU) function, where the information is formed of the sensed distances D1 to D12, the first position coordinate P1, and the first movement information MD1. The actor network M11 inputs the output of the Rectified Linear Unit function into a neural layer that includes 1 output neuron to obtain an output of a Sigmoid function (Sigmoid), and inputs the output of the Rectified Linear Unit function into another neural layer that includes 1 output neuron, so as to obtain an output of a hyperbolic tangent function (Tanh). The output of the Sigmoid function is the second two-dimensional linear velocity V2, and the output of the hyperbolic tangent function is the second angular velocity W2.

The input of the critic network M12 also includes 16-dimensional information formed of the sensed distances D1 to D12, the first position coordinate P1, and the first movement information MD1. In addition, the input of the critic network M12 further includes the second movement information MD2 obtained from the actor network M11. The 16-dimensional information is input into a neural layer that includes 512 output neurons, so as to obtain an output of a Rectified Linear Unit function. The critic network M12 inputs the output of the Rectified Linear Unit function and the second movement information MD2 into two neural layers that each include 512 output neurons, so as to obtain another Rectified Linear Unit function output (hereinafter referred to as a second Rectified Linear Unit function output). The critic network M12 inputs the second Rectified Linear Unit function output into a neural layer that includes one output neuron, so as to obtain a Rectified Linear (Linear) Unit function output. This Rectified Linear Unit function output is an evaluation value Q.

The evaluation value Q is a weighted sum of the reward values R obtained by the critic network M12 from all rounds of decision-making process. A formula for calculating the reward value R is:

$$R = \begin{cases} R_{arrive} & \text{if } d_{p2-end} < th \\ R_{collision} & \text{if } P2 \text{ reach } RA \\ C_1(d_{t-1} - d_t) - C_2 \end{cases}$$

When the distance $d_{p2-end}$ between the second position coordinate P2 and the destination coordinate is less than a threshold th, the critic network M12 sets the reward value R to $R_{arrive}$. $R_{arrive}$ is a positive value. When the second position coordinate P2 enters the coordinate range covered by a restricted region RA, that is, when the robot 1 touches the restricted region RA, the critic network M12 sets the reward value R to $R_{collision}$. $R_{collision}$ is a negative value. In addition to the above two conditions, the critic network M12 calculates a movement distance $d_{t-1}$ of a previous round of decision-making process and a movement distance $d_t$ of a current round of decision-making process based on the second movement information MD2 output in the previous round of decision-making process and the second movement information MD2 output in the current round of decision-making process. The critic network M12 multiplies a difference $(d_{t-1}-d_t)$ of the movement distance of the robot 1 between the two rounds of decision-making process by a first parameter $C_1$ and then subtracts a second parameter $C_2$ from the product to obtain a reward value R. In other words, when the number of rounds of decision-making process (that is, the number of actions) increases, the evaluation value Q decreases. The critic network M12 hereby encourages the decision-making process to make the robot 1 reach the destination by running fewer rounds (that is, performing a smaller number of actions). In some embodiments, the second parameter $C_2$ may be, but not limited to, 0.1.

Figure 7:
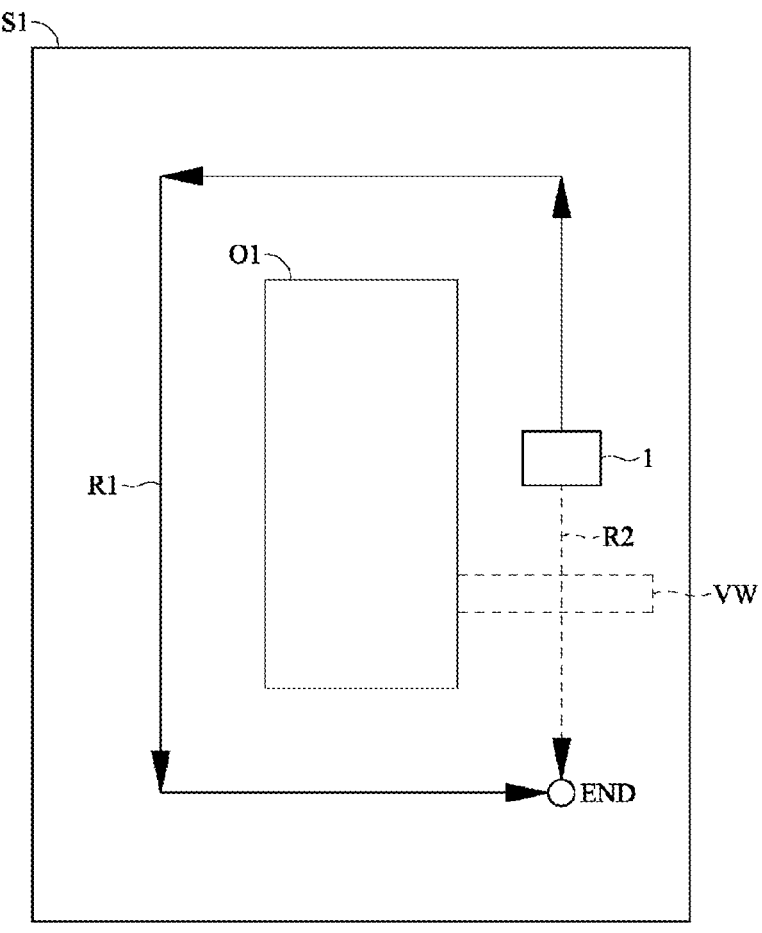
FIG. 7 is a schematic diagram of a route of a robot in a confined space according to an embodiment of the present disclosure.

FIG. 7 is a schematic diagram of a route of a robot 1 in a confined space S1 according to an embodiment of the present disclosure. Referring to FIG. 6 and FIG. 7, in some embodiments, the restricted area RA includes a physical obstacle O1 and a virtual wall VW. As shown in FIG. 7, when the robot 1 encounters no virtual wall VW in the confined space S1, the robot 1 arrives at the destination END along the route R2. During the travel to the destination END along the route R2, if the robot 1 collides with the physical obstacle O1, that is, when the robot 1 touches the restricted region RA, the critic network M12 sets the reward value R to a negative value. When the user adds a virtual wall VW in the confined space S1 for the robot 1, the robot 1 will arrive at the destination END along the route R1. During the travel to the destination END along the route R1, if the robot 1 collides with the physical obstacle O1 or the virtual wall VW, that is, when the robot 1 touches the restricted region RA, the critic network M12 sets the reward value R to a negative value. In some embodiments, the user may add a virtual wall VW in the environment at discretion to affect the route of the robot 1.

To sum up, in some embodiments, the robot 1 can provide a route guide in an unfamiliar environment without a need to create a map. The movement decision-making circuit 20 uses just the sensed distances D1 to D12, the first position coordinate P1, and the first movement information MD1 as the input into the neural network model M1, thereby greatly reducing the complexity of input data and reducing the difficulty of training. The critic network M12 adds a decremental value to the evaluation value Q to encourage the decision-making process to reach the destination by running fewer rounds, thereby reducing instability of the output of the neural network model M1. The second movement information MD2 output by the neural network model M1 is smoothed by the filter circuit 50 to reduce the probability of the robot 1 colliding around.

Although the technical content of the present disclosure has been disclosed above with reference to exemplary embodiments, the embodiments are not intended to limit the present disclosure. Any modifications and improvements made by a person skilled in the art to the embodiments without departing from the spirit of the present disclosure still fall within the scope of the present disclosure. Therefore, the protection scope of the present disclosure is subject to the claims appended hereto.

What is claimed is:

1. A navigation method applicable to a robot, wherein the robot comprises a plurality of distance sensors and a mobile device, and the navigation method comprises:

(a) setting a first position coordinate and first movement information, wherein the first position coordinate is an initial coordinate, and the first movement information is initial movement information;

(b) measuring a plurality of to-be-sensed distances in different directions by using the distance sensors;

(c) executing a decision-making process, wherein the decision-making process is to input the sensed distances, the first position coordinate, and the first movement information into a neural network model to obtain second movement information output by the neural network model;

(d) setting the second movement information as the first movement information for a next round of the decision-making process;

(e) driving, based on the second movement information, the mobile device to move the robot from the first position coordinate to a second position coordinate;

(f) setting the second position coordinate as the first position coordinate for a next round of the decision-making process; and (g) repeating steps (b) to (f) until a distance between the second position coordinate and a destination coordinate is less than a threshold;

wherein the first movement information comprises a first two-dimensional linear velocity and a first angular velocity, the first two-dimensional linear velocity is normalized to fall within an interval (0, 1), and the first angular velocity is normalized to fall within an interval (−1, 1).

2. The navigation method according to claim 1, wherein after step (c) and before steps (d) to (f), the method further comprises:

(c1) inputting the second movement information to a filter to obtain the second movement information that is smoothed.

3. The navigation method according to claim 2, wherein in step (d), the smoothed second movement information obtained in step (c1) is set as the first movement information for a next round of the decision-making process.

4. The navigation method according to claim 1, wherein the neural network model comprises:

an actor network, configured to determine the second movement information based on the sensed distances, the first position coordinate, and the first movement information; and a critic network, configured to output an evaluation value based on the sensed distances, the first position coordinate, the first movement information, and the second movement information determined by the actor network.

5. The navigation method according to claim 4, wherein the evaluation value is positively correlated with a reward value, and the navigation method further comprises:

(a1) setting a restricted region;

(a2) determining, based on the second position coordinate, whether the robot touches the restricted region; and (a3) setting the reward value to a negative value in a case that the robot touches the restricted region.

6. The navigation method according to claim 4, wherein the evaluation value is positively correlated with a reward value, and the navigation method further comprises:

(b1) calculating, based on the second movement information output in a previous round of the decision-making process and the second movement information output in a current round of the decision-making process, a difference of a movement distance of the robot between the two rounds of decision-making process; and (b2) determining the reward value based on the difference, wherein the reward value is positively correlated with the difference.

7. The navigation method according to claim 1, wherein the neural network model is a deep deterministic policy gradient algorithm (DDPG) model.

8. A robot, comprising:

a plurality of distance sensors, configured to measure a plurality of to-be-sensed distances in different directions;

a movement decision-making circuit, configured to repeatedly execute a decision-making process, wherein the decision-making process is to input the sensed distances, a first position coordinate, and first movement information into a neural network model to obtain second movement information output by the neural network model;

a mobile device; and a control circuit, configured to drive, based on the second movement information, the mobile device to move from the first position coordinate to a second position coordinate, wherein when the movement decision-making circuit initially executes the decision-making process, the first position coordinate is set as an initial coordinate, and the first movement information is set as initial movement information;

after the decision-making process is executed, the movement decision-making circuit sets the second movement information as the first movement information for a next round of the decision-making process; and after the control circuit drives, based on the second movement information, the mobile device to move from the first position coordinate to the second position coordinate, the movement decision-making circuit sets the second position coordinate as the first position coordinate of a next round of the decision-making process;

wherein the first movement information comprises a first two-dimensional linear velocity and a first angular velocity, the movement decision-making circuit normalizes the first two-dimensional linear velocity to fall within an interval (0, 1), and the movement decision-making circuit normalizes the first angular velocity W1 to fall within an interval (−1, 1).

9. The robot according to claim 8, further comprising a filter circuit coupled between the movement decision-making circuit and the control circuit and configured to smooth the second movement information.

10. The robot according to claim 8, wherein the neural network model comprises:

an actor network, configured to determine the second movement information based on the sensed distances, the first position coordinate, and the first movement information; and a critic network, configured to output an evaluation value based on the sensed distances, the first position coordinate, the first movement information, and the second movement information determined by the actor network.

* * * * *